US006680575B1

(12) United States Patent
Ushio et al.

(10) Patent No.: US 6,680,575 B1
(45) Date of Patent: Jan. 20, 2004

(54) LAMP SOCKET

(75) Inventors: Hiroki Ushio, Tokyo (JP); Mutsuo Sekiya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/110,537

(22) PCT Filed: Aug. 17, 2000

(86) PCT No.: PCT/JP00/05515

§ 371 (c)(1), (2), (4) Date: Apr. 15, 2002

(87) PCT Pub. No.: WO02/15347

PCT Pub. Date: Feb. 21, 2002

(51) Int. Cl.[7] .............................. B60Q 1/26; H01K 2/62
(52) U.S. Cl. .............................................. 315/77; 315/58
(58) Field of Search ............................. 315/57, 58, 77, 315/78, 82, 85

(56) References Cited

U.S. PATENT DOCUMENTS 3,715,613 A * 2/1973 Parkman ..................... 313/113
4,920,459 A * 4/1990 Rothwell et al. .............. 42/22
5,434,763 A * 7/1995 Hege et al. ................. 362/265
5,828,174 A 10/1998 Seiler et al.
6,075,318 A * 6/2000 Noll et al. .................. 313/573
6,084,354 A * 7/2000 Kohmura et al. ............. 315/57

FOREIGN PATENT DOCUMENTS

JP 10-64643 3/1998
WO 98/38708 A1 9/1998

* cited by examiner

*Primary Examiner*—Don Wong
*Assistant Examiner*—Minh D A
(74) *Attorney, Agent, or Firm*—Sughrue Mion, PLLC

(57) ABSTRACT

A lamp holder includes a fit recess for a lamp plug-fitted purpose, a high-voltage side terminal arranged at any one of a central section of the fit recess and a peripheral section surrounding the central section of the fit recess, a low-voltage side terminal arranged at the other, an insulation seal member insulating between the low-voltage side terminal and the high-voltage side member, and at least one projection projected outwardly from an outer peripheral wall of the insulation seal member as to make into contact with an inner peripheral wall of a fit section of the lamp plug side.

10 Claims, 7 Drawing Sheets

LAMP SOCKET

TECHNICAL FIELD

The invention relates to a lamp holder holding a lamp such as a high-intensity discharge lamp and so on, which are used as automotive headlights.

BACKGROUND ART

Recent years have seen a tendency to shift from halogen lamps to high-intensity discharge lamps (hereafter, referred as HID) such as metal halide lamps, high-pressure sodium lamps, mercury-vapor lamps and so on in the area of the automobile headlights. There are reasons that the HID has advantage over the halogen lams in having a ray bundle larger, energy efficiency higher and wear characteristics longer than the halogen lamps. Such a discharge lamp-equipped lighting device includes the discharge lamp described above, an igniter performing the instantaneous high-voltage discharge, and a ballast controlling the igniter.

The lamp holder for holding the discharge lamp in the discharge lamp-equipped lighting device has high-voltage side and low-voltage side terminals. An insulating seal member providing electrical isolation between both terminals is disposed between both terminals in order to apply the high-voltage of approximately 30 kV to the lamp.

Concretely, the high-voltage side terminal connected to a high-voltage side of a lamp plug is disposed at a central section of the lamp holder. The low-voltage side terminal connected to a low-voltage side of the lamp plug is disposed at a section close to the outer periphery of the lamp holder. The insulating seal member insulating perfectly and electrically between both terminals is disposed between both terminals. It is possible to increase insulation and withstand voltage performance due to the insulating seal member to obtain a lamp to allow withstanding the high-voltage.

With the lamp, the insulating seal member is simply mated with an outer periphery of a cylindrical guide section enclosing the high-voltage side terminal. Therefore, when the discharge lamp is removed from the lamp holder in order to replace the lamp by new one, there may be cases where the insulating seal member is broken away from the lamp holder with the insulating seal member being adhered to the discharge lamp side. When a new discharge lamp is mounted on the lamp holder without becoming aware of the breakage of the insulating seal member, the new one is mounted on the lamp holder without using the insulating seal member. Therefore, there may be cases where the lighting device sustains damage owing to defective insulation.

To solve such a problem, it is known that another member is added to prevent the insulating seal member from being broken away from the lamp holder on removing the discharge lamp. For example, JP-A-64643/1998 discloses a lamp holder to ensure the fixation of the insulating seal member even when the lamp plug is removed from the lamp holder. With the lamp holder, a section to be equipped with a stopper is arranged at a section to be equipped with high-voltage terminal in order to keep the insulation and withstand voltage performance when a new lamp is mounted. It is possible to prevent the insulating seal member from being removed due to a stopper mounted on the section.

FIG. 1 is a cross sectional view of explaining a structure of preventing the insulating seal member from being removed from the discharge lighting device disclosed in the JP-A-64643/1998 described above. In the drawing, a reference numeral 1 denotes a discharge lamp, a reference numeral 2 denotes a lamp plug of the discharge lamp 1, and a reference numeral 3 denotes a lamp holder having the functions of holding the discharge lamp 1 and of applying power thereto. A reference numeral 4 denotes a high-voltage side terminal for applying the high-voltage to the high-voltage side of the discharge lamp 1, and a reference numeral 5 denotes a low-voltage side terminal connected to the low-voltage side of the discharge lamp 1. A reference numeral 6 denotes a guide section integral with the lamp holder 3 to constitute an outer peripheral wall of the lamp holder 3. The guide section 6 is formed vertically in a fit recess 3*a* for a lamp plug-fitted purpose. A fit section 2*a* of the lamp plug 2 includes a central section 2*b* making contact with the high-voltage side terminal 4, and a peripheral section 2*c* enclosing the central section 2*b* and making contact with the low-voltage side terminal 5. An inner peripheral wall 2*d* of the peripheral section 2*c* is tapered. A reference numeral 7 denotes an insulating seal member sheathed on the outer periphery of the guide section 6 in order to provide electrical isolation between the high-voltage and low-voltage sides. An outer peripheral wall 7*a* of the insulating seal member 7 is so reverse-tapered as to allow making contact with the inner peripheral wall 2*d* of the peripheral section 2*c* of the lamp plug 2 above. A reference numeral 8 denotes an approximately cylindrical-shaped stopper holding one end of the insulating seal member 7. A circle section 8*a* of the stopper 8 projects outwardly from the one end of the stopper 8 in a radial direction thereof and makes into contact with an upper end of the guide section 6.

A method of assembling parts will be explained hereafter. The insulating seal member 7 is sheathed on the outer periphery of the guide section 6 of the lamp holder 3 to obtain an assembled unit. The assembled unit is inserted into the lamp holder 3, and then the insulating seal member 7 is held due to the circle section 8*a* of the stopper 8.

However, since the conventional lamp holder is constituted as described above, it is necessary to add newly parts corresponding to the stopper 8, for example, as another member for preventing the insulating seal member 7 from being removed from the discharge lighting device. The addition of parts leads to not only complicate the structure of the lamp holder to but also increase the cost of manufacturing the lamp holder.

With the conventional lamp holder, the insulating seal member 7 is molded of silicone rubber with flexibility. When the inner peripheral wall 2*d* of the lamp plug 2 adheres to the outer peripheral wall 7*a* of the insulating seal member 7 and the discharge lamp 1 is removed from the lamp holder, it is possible to prevent the insulating seal member 7 from being removed therefrom. However, since tear strength of the insulating seal member 7 is weak, the insulating seal member 7 facilitates turning and tearing in part and the correct insulation performance is not kept.

Moreover, with the conventional lamp holder, the guide section 6 is formed at the lamp holder 3 in one piece, and a projected peripheral section of the guide section 6 is higher than the guide section 6. Therefore, there is possibility of impairing the workability of inserting the insulating seal member 7 into the guide section 6.

The invention was made to solve the foregoing problems. Accordingly, it is an object of the invention to provide a lamp holder having a simple structure with improved workability without increasing a parts count. The lamp holder allows reduction of the cost of manufacture, and prevents the insulating seal member adhered to the lamp plug from being broken away from the lamp plug on removing the discharge lamp to replace it by new one. The lamp holder allows to preclude defective insulation caused by dropouts, displacements, entanglement or cracking of the insulating seal member on assembling new parts into the lamp holder, and prevent malfunctions such as damage of the lamp or no-lighting and so on.

DISCLOSURE OF THE INVENTION

In order to achieve the object of the invention, we provide a lamp holder comprising: a fit recess for a lamp plug-fitted purpose; a high-voltage side terminal arranged at any one of a central section of the fit recess and a peripheral section surrounding the central section of the fit recess; a low-voltage side terminal arranged at the other; and an insulation seal member insulating between the low-voltage side terminal and the high-voltage side member, wherein at least one projection is so projected outwardly from an outer peripheral wall of the insulation seal member as to make into contact with an inner peripheral wall of a fit section of the lamp plug side. In this way, it is possible to extensively reduce a contact area between the inner peripheral wall of the fit section of the lamp plug and the insulating seal member. Therefore, when the lamp plug is removed from the lamp holder, it is possible to reduce remarkably the adhesive force and the frictional force between the insulating seal member and the contact face of the inner peripheral wall. Accordingly, it is possible to prevent the insulating seal member from being removed from the lamp holder together with the lamp plug without adding new parts. As a result, it is possible to hold the insulating seal member on the lamp holder with stability.

With the above arrangement, the projection of the insulation seal member may be a rib-shaped rim-projection projected outwardly from the outer peripheral wall of the insulation seal member in a radial direction of the insulation seal member and extending in a peripheral direction. In this way, since the contact area between the inner peripheral wall of the fit section of the lamp plug and the insulating seal member is extensively reduced, the adhesive force and the frictional force between the rim-projection and the contact face can be reduced remarkably. On the other hand, since the whole peripheral wall of the insulating seal member can make into contact with the inner peripheral wall of the fit section of the lamp plug, it is possible to improve insulation seal performance of the lamp holder. Accordingly, it is possible to prevent the insulating seal member from being removed from the lamp holder together with the lamp plug and to improve the insulation performance of the insulating seal member. As a result, it is possible to hold the insulating seal member on the lamp holder with high stability.

With the above arrangement, the projection of the insulation seal member may be a brim-shaped edge-projection projected outwardly from an edge of the insulation seal member in a radial direction of the insulation seal member, the cylindrical fit section of the lamp plug side may press the brim-shaped edge-projection against the fit recess and the outer peripheral wall of the insulation seal member may keep a distance from the inner peripheral wall of the fit section of the lamp plug side. In this way, the outer peripheral wall of the insulating seal member does not make into contact with the inner peripheral wall of the fit section of the lamp plug. Therefore, there is no risk of affixing the outer peripheral wall of the insulating seal member to the inner peripheral wall of the fit section of the lamp plug. Moreover, if the brim-shaped edge projection is affixed to the inner peripheral wall, a frictional force produced between the insulating seal member and a guide section is extremely larger than a peel force produced on peeling the insulating seal member. Therefore, it is possible to prevent the insulating seal member from being removed from the lamp holder together with the lamp plug.

With the above arrangement, the projection of the insulation seal member may include a rim-projection projected outwardly from the outer peripheral wall of the insulation seal member in a radial direction of the insulation seal member and a brim-shaped edge-projection projected outwardly from an edge of the insulation seal member in a radial direction of the insulation seal member, and the cylindrical fit section of the lamp plug side may press the brim-shaped edge-projection against the fit recess. In this way, the outer peripheral wall of the insulating seal member makes into contact with the inner peripheral wall via only the projections arranged at the outer peripheral wall of the insulating seal member. Therefore, if the projections of the outer peripheral wall of the insulating seal member are affixed to the inner peripheral wall, the adhesive force is very weak. Furthermore, the projections are effective to improve insulation performance of the insulating seal member. When the lamp plug is removed from the lamp holder, it is possible to prevent the insulating seal member from being removed from the lamp holder together with the lamp plug. Therefore, it is possible to hold the insulating seal member on the lamp holder with stability without loss of the insulation performance.

With the above arrangement, the rim-projection may be at least one rib extending in a peripheral direction of the insulation seal member. In this way, the outer peripheral wall of the insulating seal member makes into contact with the inner peripheral wall via only a front end of the rim-projection arranged at the outer peripheral wall of the insulating seal member. Therefore, if the rim-projection of the outer peripheral wall of the insulating seal member is affixed to the inner peripheral wall, the adhesive force is very weak. Furthermore, the rim-projection is effective to improve insulation performance of the insulating seal member. When the lamp plug is removed from the lamp holder, it is possible to prevent the insulating seal member from being removed from the lamp holder together with the lamp plug. Therefore, it is possible to hold the insulating seal member on the lamp holder with stability without loss of the insulation performance.

In order to achieve the object of the invention, we provide a lamp holder comprising: a high-voltage side terminal formed at an igniter generating a high voltage in one piece and installed in a socket for allowing insertion of a lamp plug, wherein a secondary side coil of the igniter is connected with a central section of the socket; a low-voltage side terminal connected with a driving circuit in a periphery of the socket; and an insulation seal member insulating between the low-voltage side terminal and the high-voltage side member, wherein a guide section allowing insertion of the insulating seal member is formed integrally at a bobbin constituting a primary and secondary winding of the igniter, and wherein at least one projection is so projected outwardly from an outer peripheral wall of the insulation seal member as to make into contact with an inner peripheral wall of a fit section of the lamp plug side. In this way, we can obtain some effects hereafter. That is, the conventional guide section is formed at the lamp holder in one piece, and further locates at a central recess of the lamp holder. When the insulating seal member is therefore inserted into the guide section, undesired projections are so formed at a periphery of the guide section as to obstruct assembly of the lamp holder. However, with the above arrangement according to the invention, it is possible to assemble the insulating seal member in a step of assembling singly the igniter. It is possible to facilitate the assembly of the insulating seal member because a projection higher than the holder is not formed. In a state of mounting the lamp on the holder, the contact area between the inner peripheral wall of the fit section of the lamp plug and the projections is extensively reduced as compared with the conventional lamp holder. Therefore, it is possible to reduce remarkably the adhesive force or the frictional force between the insulating seal member and the contact face of the inner peripheral wall. Accordingly, it is possible to facilitate assembly of the insulating seal member and to prevent the insulating seal member from being removed from the lamp holder together with the lamp plug without adding new parts. Moreover, it is possible to hold the insulating seal member on the lamp holder with stability.

With the above arrangement, the projection of the insulation seal member may be a rib-shaped rim-projection projected outwardly from the outer peripheral wall of the insulation seal member in a radial direction of the insulation seal member and extending in a peripheral direction. In this way, it is possible to facilitate assembly of the insulating seal member. Since the contact area between the inner peripheral wall of the fit section of the lamp plug and the insulating seal member is extensively reduced, the adhesive force and the frictional force between the rim-projection and the contact face can be reduced remarkably. On the other hand, since the whole peripheral wall of the insulating seal member can make into contact with the inner peripheral wall of the fit section of the lamp plug, it is possible to improve insulation seal performance of the lamp holder. Accordingly, it is possible to prevent the insulating seal member from being removed from the lamp holder together with the lamp plug and to improve the insulation performance of the insulating seal member. As a result, it is possible to hold the insulating seal member on the lamp holder with high stability.

With the above arrangement, the projection of the insulation seal member may be a brim-shaped edge-projection projected outwardly from an edge of the insulation seal member in a radial direction of the insulation seal member, the cylindrical fit section of the lamp plug side may press the brim-shaped edge-projection against the fit recess and the outer peripheral wall of the insulation seal member may keep a distance from the inner peripheral wall of the fit section of the lamp plug side. In this way, the outer peripheral wall of the insulating seal member does not make into contact with the inner peripheral wall of the fit section of the lamp plug. Therefore, there is no risk of affixing the outer peripheral wall of the insulating seal member to the inner peripheral wall of the fit section of the lamp plug. Moreover, if the brim-shaped edge projection is affixed to the inner peripheral wall, a frictional force produced between the insulating seal member and a guide section is extremely larger than a peel force produced on peeling the insulating seal member. Therefore, it is possible to prevent the insulating seal member from being removed from the lamp holder together with the lamp plug.

With the above arrangement, the projection of the insulation seal member may include a rim-projection projected outwardly from the outer peripheral wall of the insulation seal member in a radial direction of the insulation seal member and a brim-shaped edge-projection projected outwardly from an edge of the insulation seal member in a radial direction of the insulation seal member, and the cylindrical fit section of the lamp plug side may press the brim-shaped edge-projection against the fit recess. In this way, it is possible to facilitate assembly of the insulating seal member. Moreover, the outer peripheral wall of the insulating seal member makes into contact with the inner peripheral wall via only the projections arranged at the outer peripheral wall of the insulating seal member. Therefore, if the projections of the outer peripheral wall of the insulating seal member are affixed to the inner peripheral wall, the adhesive force is very weak. Furthermore, the projections are effective to improve insulation performance of the insulating seal member. When the lamp plug is removed from the lamp holder, it is possible to prevent the insulating seal member from being removed from the lamp holder together with the lamp plug. Therefore, it is possible to hold the insulating seal member on the lamp holder with stability without loss of the insulation performance.

With the above arrangement, the rim-projection may be at least one rib extending in a peripheral direction of the insulation seal member. In this way, it is possible to facilitate assembly of the insulating seal member. Moreover, the outer peripheral wall of the insulating seal member makes into contact with the inner peripheral wall via only the rim-projection arranged at the outer peripheral wall of the insulating seal member. Therefore, if the rim-projection of the outer peripheral wall of the insulating seal member is affixed to the inner peripheral wall, the adhesive force is very weak. Furthermore, the rim-projection is effective to improve insulation performance of the insulating seal member. When the lamp plug is removed from the lamp holder, it is possible to prevent the insulating seal member from being removed from the lamp holder together with the lamp plug. Therefore, it is possible to hold the insulating seal member on the lamp holder with stability without loss of the insulation performance.

BEST MODES FOR CARRYING OUT THE INVENTION

To explain the invention more in detail, the best modes of carrying out the invention will be described with reference to the accompanying drawings.

Embodiment 1

Figure 1:
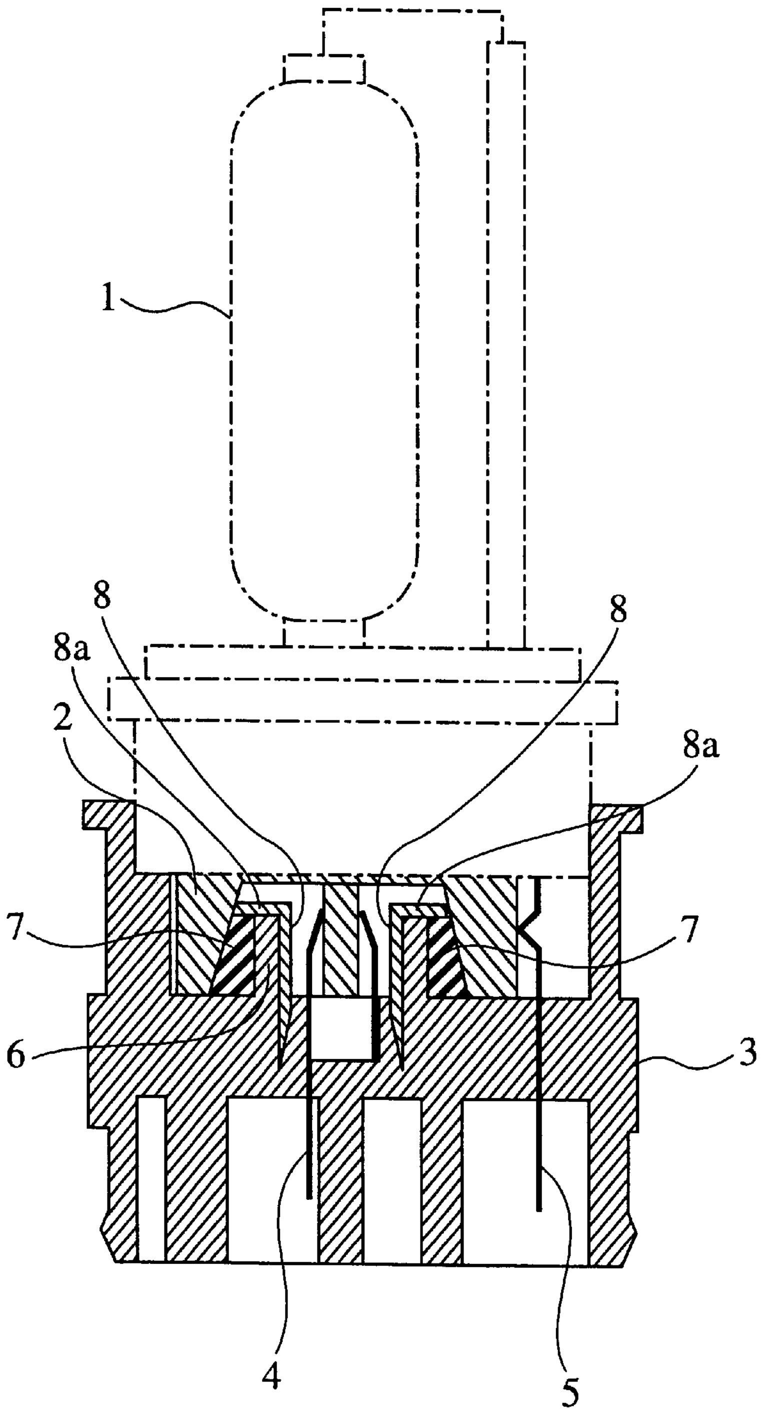
FIG. 1 is a diagrammatic cross sectional view of explaining a structure of preventing an insulating seal member from being removed from the conventional HID lighting device.
Figure 2:
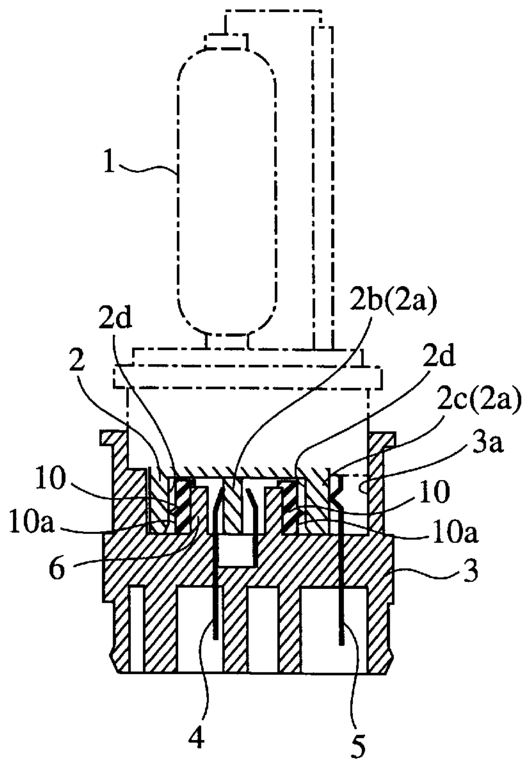
FIG. 2 is a diagrammatic cross sectional view of an internal structure of a lamp holder as embodiment 1 according to the invention.
Figure 3:
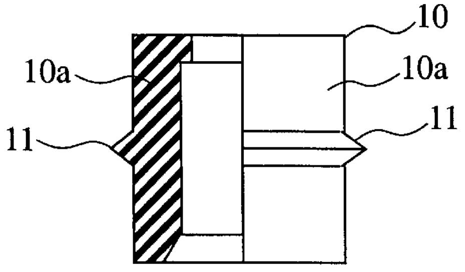
FIG. 3 is an enlarged front view, partially cross-sectioned, of an insulating seal member of the lamp holder as embodiment 1 according to the invention.

FIG. 2 is a diagrammatic cross sectional view of an internal structure of a lamp holder as embodiment 1 according to the invention. FIG. 3 is an enlarged front view, partially cross-sectioned, of an insulating seal member of the lamp holder as embodiment 1 according to the invention. Components of the embodiment 1 common to those of the conventional lamp holder shown in FIG. 1 are denoted by the same reference numerals and further description will be omitted.

In FIG. 2 and FIG. 3, a reference numeral 10 denotes an insulating seal member in the embodiment 1. The insulating seal member 10 is a cylindrical member mountable on an outer periphery of the guide section 6. A rib-shaped rim-projection 11 having a triangle-shape in cross section is formed at an outer peripheral wall 10*a* of the insulating seal member 10. The rim-projection 11 projects outwardly in a radial direction of the outer peripheral wall 10*a* and extends over the outer peripheral wall 10*a* in a peripheral direction. The fit section 2*a* of the lamp plug 2 is so constructed as to fit into the fit recess 3*a*. The fit section 2*a* includes the central section 2*b* making contact with the high-voltage side terminal 4, and the peripheral section 2*c* enclosing the central section 2*b* and making contact with the low-voltage side terminal 5. Only the rim-projection 11 in the insulating seal member 10 mounted on the outer periphery of the guide section 6 makes into contact with the inner peripheral wall (inner peripheral wall of the fit section close to the lamp plug) 2*d* of the peripheral section 2*c* of the lamp plug 2. The outer peripheral wall 10*a* other than the rim-projection 11 of the insulating seal member 10 does not make into contact with the inner peripheral wall 2*d* of the peripheral section 2*c* and keeps a distance therefrom at all times. Such an insulating seal member 10 is inserted into the outer periphery of the guide section 6 as in the conventional case to be assembled into the lamp holder and provides adequately electrical isolation between the high-voltage side and the low-voltage side.

As described above, with the embodiment 1, the inner peripheral wall 2*d* of the fit section 2*a* of the lamp plug 2 makes into contact with only a front end of the rim-projection 11 of the insulating seal member 10. As a result, an area of the insulating seal member 10 making contact with the fit section 2*a* becomes smaller than that of the conventional lamp holder. In this way, it is possible to resist affixing the insulating seal member 10 to the fit section 2*a* and to reduce friction between both contact sections when the lamp plug 2 is removed from the lamp holder to replace the discharge lamp 1 by new one, for example. Therefore, the insulating seal member 10 does not separate from the lamp holder 3 with the insulating seal member 10 being affixed to the lamp plug 2. Since the friction between the contact sections is low, it is possible to reduce the risk of the insulating seal member 10 being rolled up and torn previously even when a high-flexible, easy-to-tear material such as silicone rubber is used as the insulating seal member 10. It is possible to keep the insulating functions with stability even when the replacement of the lamp is repeated.

Figure 4:
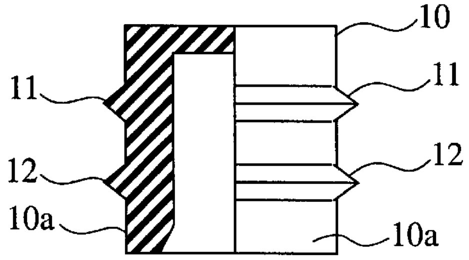
FIG. 4 is an enlarged front view, partially cross-sectioned, of an alternative example of the insulating seal member of the lamp holder as embodiment 2 according to the invention.

Moreover, with the embodiment 1, the rib-shaped rim-projection 11 is arranged at the outer peripheral wall 10*a* of the insulating seal member 10. The invention is not limited to such a construction and is not restricted to the shape, the number, or the direction of the rim-projection 11. Two rim-projections 11 may be arranged as shown in FIG. 4. FIG. 4 is an enlarged front view, partially cross-sectioned, of an alternative example of the insulating seal member of the lamp holder as embodiment 1 according to the invention. Two parallel rim-projections 11 and 12 keeping a distance from each other and extending in the peripheral direction are formed at the outer peripheral wall 10*a* of the insulating seal member 10 as shown in FIG. 4. Both of the rib-projections 11 and 12 make into contact with the inner peripheral wall 2*d* of the fit section 2*a* of the lamp plug 2. It is possible to prevent the outer peripheral wall 10*a* of the insulating seal member 10 from keeping a distance from the inner peripheral wall 2*d* of the fit section 2*a* of the lamp plug 2. Therefore, it is possible to prevent the insulating seal member 10 from being separated from the lamp holder 3 and to keep the insulating functions with stability.

With the embodiment 1, the rim-projection 11 or 12 has a triangle-shape in cross section. The rim-projection 11 or 12 may have any shape such as half-round shape or trapezoidal shape in cross section, the shape allowing reduction of the contact area between the rim-projection 11 or 12 and the inner peripheral wall 2*d* of the fit section 2*a* of the lamp plug 2. It is possible to obtain a similar effect to the peripheral case even when the projection is formed in an axial direction of the lamp plug 2 instead of the peripheral direction.

Embodiment 2

Figure 5:
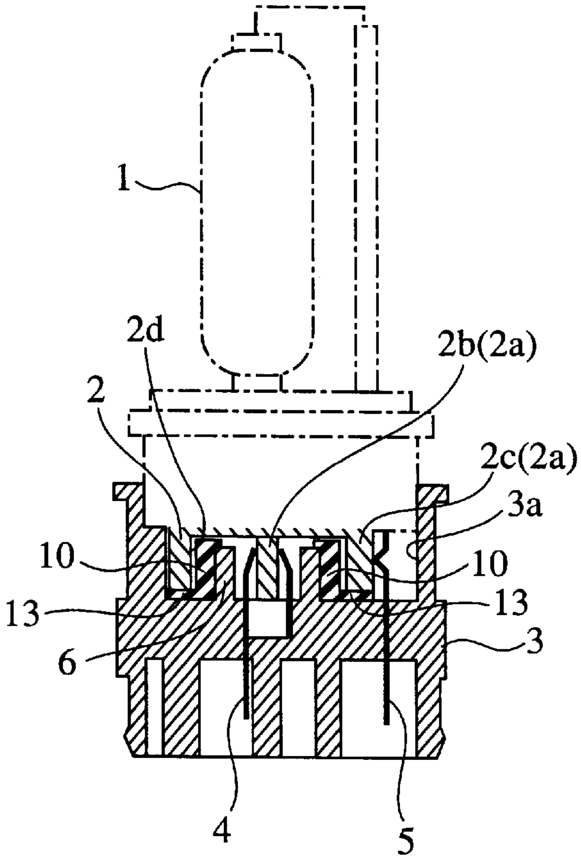
FIG. 5 is a diagrammatic cross sectional view of an internal structure of a lamp holder as embodiment 2 according to the invention.
Figure 6:
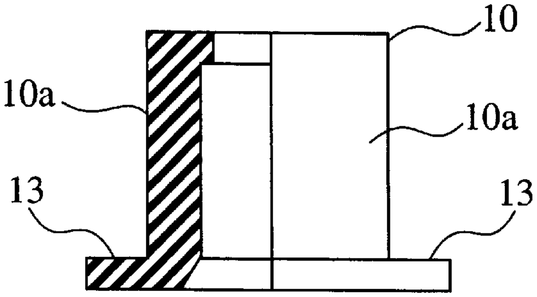
FIG. 6 is an enlarged front view, partially cross-sectioned, of an insulating seal member of the lamp holder as embodiment 2 according to the invention.

FIG. 5 is a diagrammatic cross sectional view of an internal structure of a lamp holder as embodiment 2 according to the invention. FIG. 6 is an enlarged front view, partially cross-sectioned, of an insulating seal member of the lamp holder as embodiment 2 according to the invention. Components of the embodiment 2 common to those of the embodiment 1 are denoted by the same reference numerals and further description will be omitted.

The embodiment 2 is characterized in that a brim-shaped edge-projection 13 is formed at the outer peripheral wall 10*a* of the insulating seal member 10 instead of the rim-projection 11 or 12 in the embodiment 1. The brim-shaped edge-projection 13 projects outwardly from one end of the outer peripheral wall 10*a* in a radial direction of the wall 10*a* and extends over the outer peripheral wall 10*a* in a peripheral direction of the wall 10*a*. The outer peripheral wall 10*a* of the insulating seal member 10 is separated from the inner peripheral wall 2*d* of the fit section 2*a* of the lamp plug 2.

The insulating seal member 10 in the embodiment 2 is mounted on the outer periphery of the guide section 6 arranged at the lamp holder 3. In such a state, when the lamp plug 2 is incorporated into the lamp holder 3, the brim-shaped edge-projection 13 is pressed against a bottom side of the fit recess 3*a* of the lamp holder 3 due to the fit section 2*a* of the lamp plug 2. The brim-shaped edge-projection 13 of the insulating seal member 10 therefore becomes caught in the gap between the front end of the fit section 2*a* of the lamp plug 2 and the bottom of the fit recess 3*a* of the lamp holder 3. At this time, the inner peripheral wall 2*d* of the fit section 2*a* of the lamp plug is so separated from the outer peripheral wall 10*a* of the insulating seal member 10 as to prevent both from making into contact with each other or being adhered to each other.

As described above, with the embodiment 2, the inner peripheral wall 2*d* of the fit section 2*a* of the lamp plug 2 does not make into contact with the outer peripheral wall 10*a* of the insulating seal member 10. The front end of the fit section 2*a* of the lamp plug 2 also makes into contact with only the brim-shaped edge-projection 13 arranged at the insulating seal member 10. In this way, the inner peripheral wall 2*d* of the fit section 2*a* of the lamp plug 2 is not entirely affixed to the outer peripheral wall 10*a* of the insulating seal member 10. When the lamp plug 2 is therefore removed from the lamp holder to replace the discharge lamp 1 by new one, the insulating seal member 10 does not separate from the lamp holder 3 with the insulating seal member 10 being affixed to the lamp plug 2. Since the inner peripheral wall 2*d* does not make into contact with the outer peripheral wall 10*a*, it is possible to reduce the risk of the member 10 being rolled up and torn previously even when a high-flexible, easy-to-tear material such as silicone rubber is used as the member 10. It is possible to keep the insulating functions with stability even when the replacement of the lamp is repeated.

With the embodiment 2, the brim-shaped edge-projection 13 arranged at the insulating seal member 10 is made of elastic materials such as silicone rubber and so on. When the discharge lamp 1 is therefore inserted into the lamp holder 3, it is possible to preclude the clearance between the discharge lamp 1 and the lamp holder 3, which is produced due to variations in part size, due to an elastic rebound force of the brim-shaped edge-projection 13.

Embodiment 3

Figure 7:
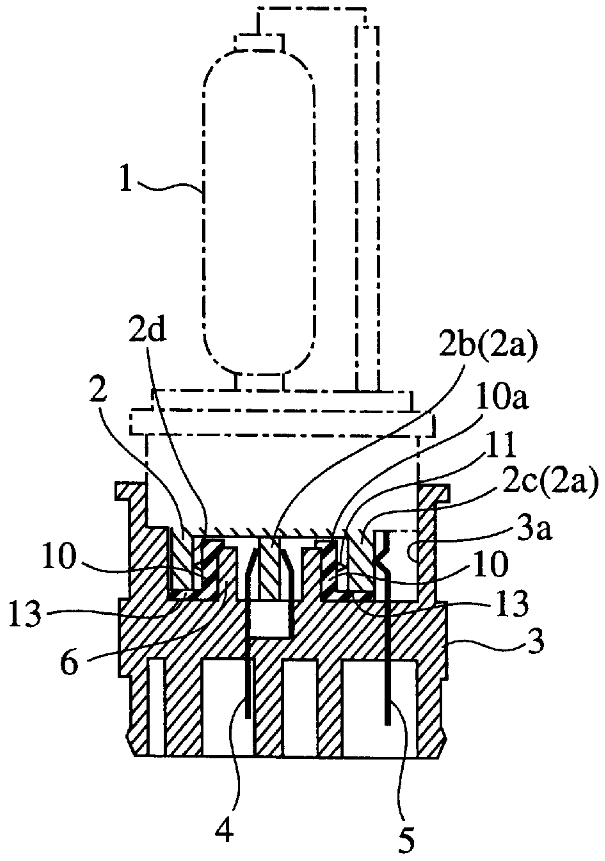
FIG. 7 is a diagrammatic cross sectional view of an internal structure of a lamp holder as embodiment 3 according to the invention.

FIG. 7 is a diagrammatic cross sectional view of an internal structure of a lamp holder as embodiment 3 according to the invention. Components of the embodiment 3 common to those of the embodiment 1 and so on are denoted by the same reference numerals and further description will be omitted.

The embodiment 3 is characterized in that the rim-projection 11 in the embodiment 1 and the brim-shaped edge-projection 13 in the embodiment 2 are arranged at the outer peripheral wall 10*a* of the insulating seal member 10.

The insulating seal member 10 in the embodiment 3 is mounted on the outer periphery of the guide section 6 arranged at the lamp holder 3. In such a state, when the lamp plug 2 is incorporated into the lamp holder 3, the brim-shaped edge-projection 13 of the insulating seal member 10 is pressed against a bottom side of the fit recess 3*a* of the lamp holder 3. The brim-shaped edge-projection 13 of the insulating seal member 10 therefore becomes caught in the gap between the front end of the fit section 2*a* of the lamp plug 2 and the bottom of the fit recess 3*a* of the lamp holder 3. At this time, the inner peripheral wall 2*d* of the lamp plug 2 makes into contact with the rim-projection 11 arranged at the outer peripheral wall 10*a* of the insulating seal member 10.

As described above, with the embodiment 3, the inner peripheral wall 2*d* of the lamp plug 2 makes into contact with the front end of the rim-projection 11 arranged at the outer peripheral wall 10*a* of the insulating seal member 10. At the same time, the front end of the lamp plug 2 makes into contact with the brim-shaped edge-projection 13 of the insulating seal member 10 to be pressed down due to the lamp plug 2. In this way, it is possible to resist affixing the outer peripheral wall 10*a* of the insulating seal member 10 to the inner peripheral wall 2*d* of the fit section 2*a* of the lamp plug 2. When the lamp plug 2 is therefore removed from the lamp holder to replace the discharge lamp 1 by new one, the insulating seal member 10 does not separate from the lamp holder 3 with the insulating seal member 10 being affixed to the lamp plug 2. Since the friction between the contact sections is low, it is possible to reduce the risk of the member 10 being rolled up and torn previously even when a high-flexible, easy-to-tear material such as silicone rubber is used as the member 10. It is possible to keep the insulating functions with stability even when the replacement of the lamp is repeated.

With the embodiment 3, the brim-shaped edge-projection 13 arranged at the insulating seal member 10 is made of elastic materials such as silicone rubber and so on. When the discharge lamp 1 is therefore inserted into the lamp holder 3, it is possible to preclude the clearance between the discharge lamp 1 and the lamp holder 3, which is produced due to variations in part size, due to an elastic rebound force of the brim-shaped edge-projection 13.

Figure 8:
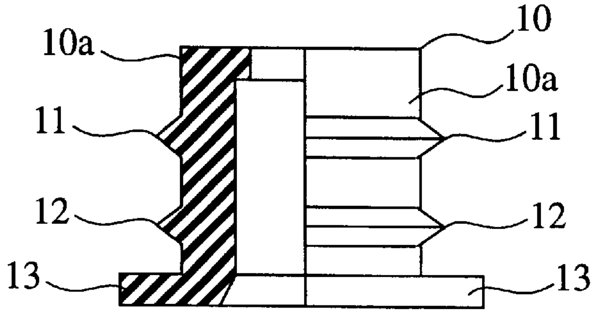
FIG. 8 is an enlarged front view, partially cross-sectioned, of an alternative example of the insulating seal member of the lamp holder as embodiment 3 according to the invention.

With the embodiment 3, the rib-shaped rim-projection 11 is arranged at the outer peripheral wall 10*a* of the insulating seal member 10. Alternatively, two or more rim-projections 11 may be arranged. FIG. 8 is an enlarged front view, partially cross-sectioned, of an alternative example of the insulating seal member of the lamp holder as embodiment 3 according to the invention. As shown in FIG. 8, the rim-projection 12 and the brim-shaped edge-projection 13 are formed at the outer peripheral wall 10*a* of the insulating seal member 10. The rim-projection 12 has the same shape in cross section as the rim-projection 11 and extends in the peripheral direction parallel to the rim-projection 11. The brim-shaped edge-projection 13 projects outwardly from one end of the outer peripheral wall 10*a* in a radial direction of the wall 10*a* and extends over the outer peripheral wall 10*a* in a peripheral direction of the wall 10*a*.

With the alternative example of the embodiment 3, it is possible to facilitate assembling the insulating seal member 10 into the lamp holder 3. The outer peripheral wall 10*a* makes into contact with the inner peripheral wall 2*d* via only the rim-projections 11 and 12. Therefore, if the rim-projections 11 and 12 of the outer peripheral wall 10*a* of the insulating seal member 10 is affixed to the inner peripheral wall 2*d*, the adhesive force is very weak. Furthermore, the rim-projections 11 and 12 are effective to improve insulation performance of the insulating seal member 10. When the lamp plug 2 is removed from the lamp holder, it is possible to prevent the insulating seal member 10 from being removed from the lamp holder together with the lamp plug 2. Therefore, it is possible to hold the insulating seal member 10 on the lamp holder 3 with stability without loss of the insulation performance.

Embodiment 4

Figure 9:
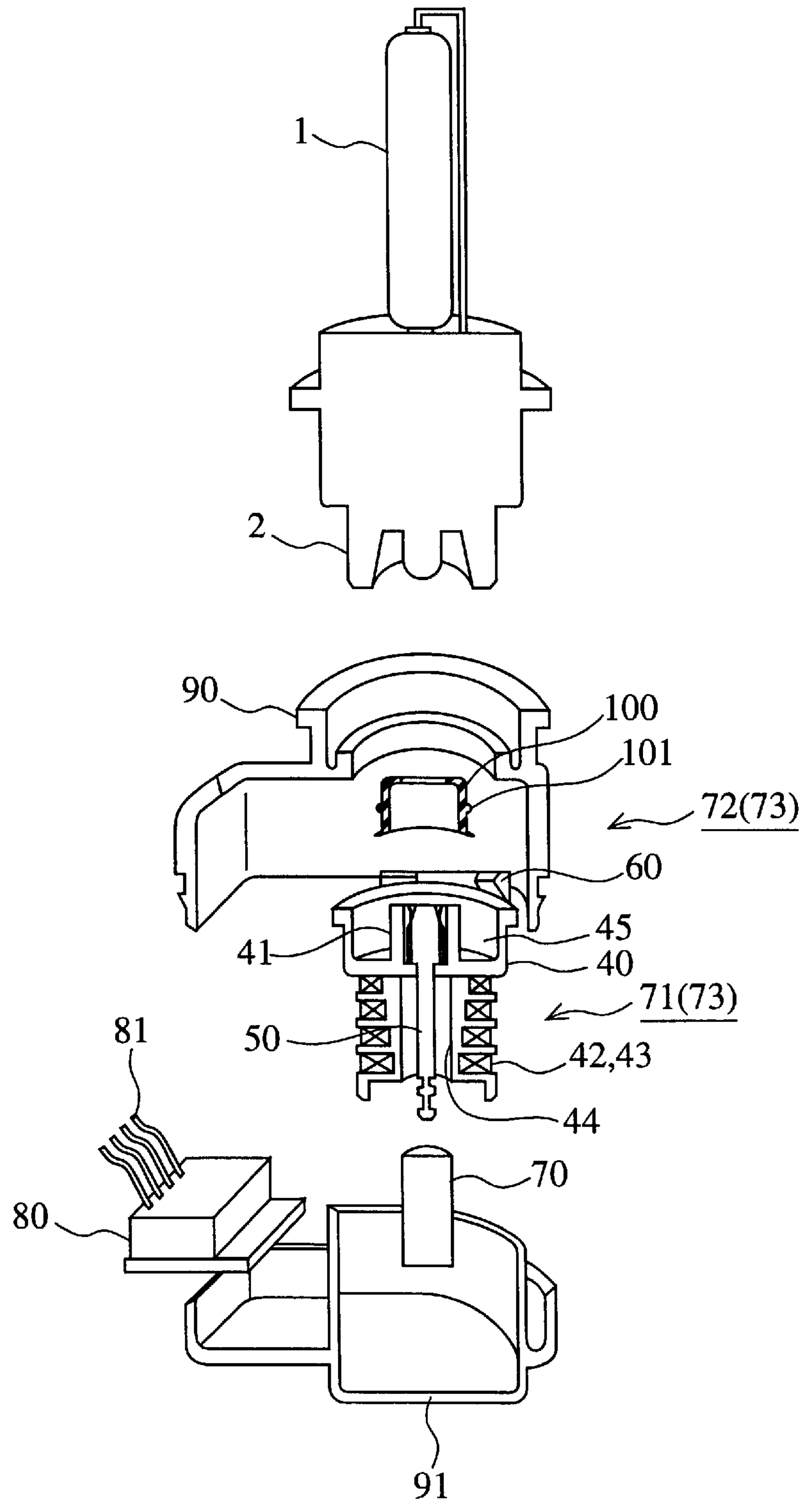
FIG. 9 is an exploded perspective view, partially cross-sectioned, of an internal structure of a lamp holder as embodiment 4 according to the invention.
Figure 10:
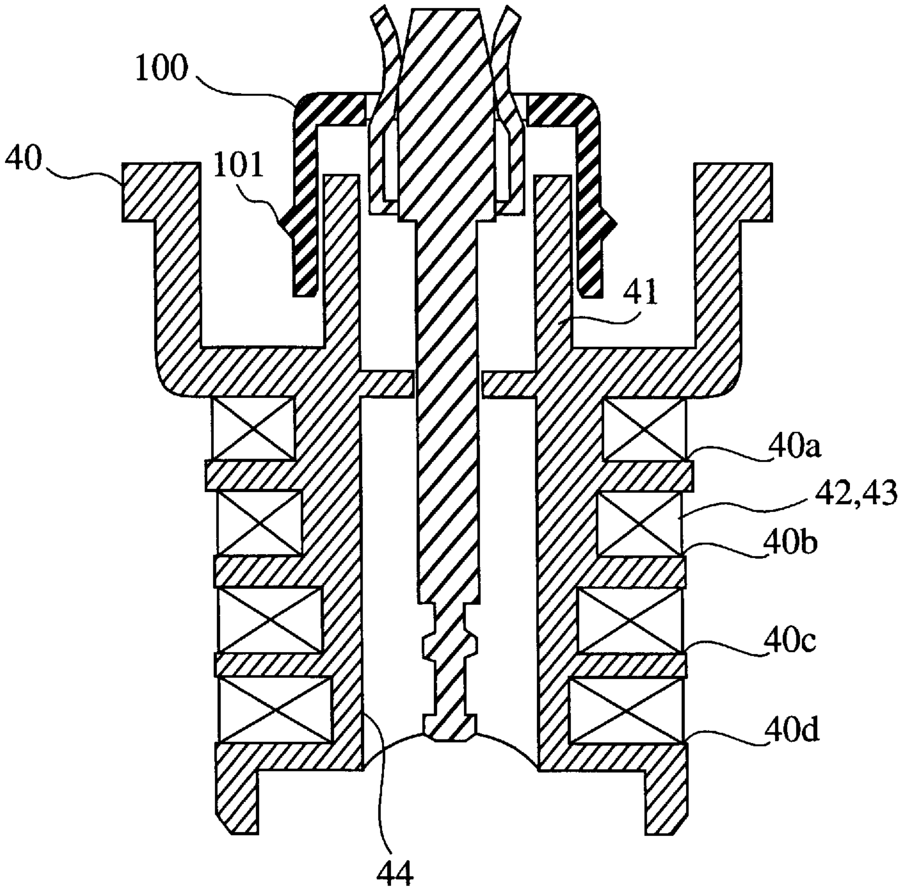
FIG. 10 is a diagrammatic cross sectional view of an igniter in the lamp holder as embodiment 4 according to the invention.
Figure 11:
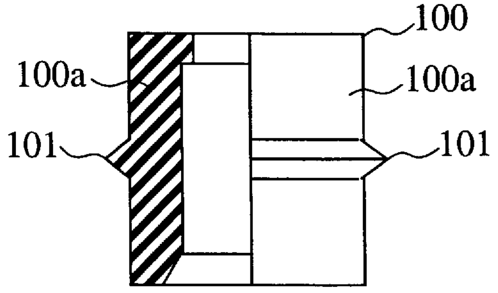
FIG. 11 is a diagrammatic front view, partially cross-sectioned, of an insulating seal member in the lamp holder as embodiment 4 according to the invention.
Figure 12:
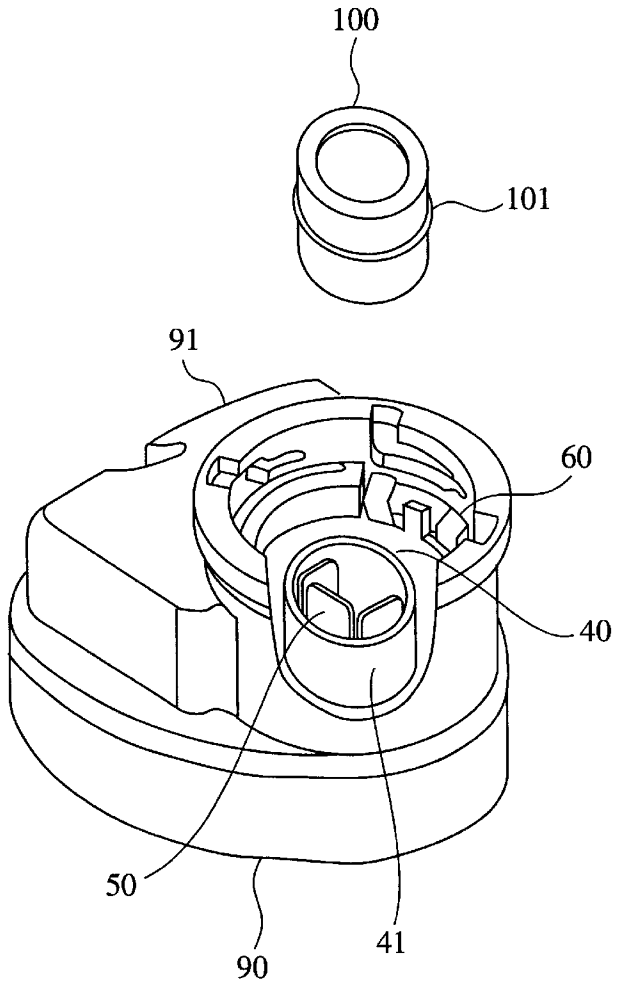
FIG. 12 is an exploded perspective view, partially cross-sectioned, of the lamp holder as embodiment 4 according to the invention.

FIG. 9 is an exploded perspective view, partially cross-sectioned, of an internal structure of a lamp holder as embodiment 4 according to the invention. FIG. 10 is a diagrammatic cross sectional view of an igniter in the lamp holder as embodiment 4 according to the invention. FIG. 11 is a diagrammatic front view, partially cross-sectioned, of an insulating seal member in the lamp holder as embodiment 4 according to the invention. FIG. 12 is an exploded perspective view, partially cross-sectioned, of the lamp holder as embodiment 4 according to the invention. Components of the embodiment 4 common to those of the embodiment 1 and so on are denoted by the same reference numerals and further description will be omitted.

With the embodiment 4, the characteristic portions in the embodiment 1 to the embodiment 3 apply to an igniter-integrated lamp holder as shown in FIG. 9 and FIG. 10 according to the previous co-pending application.

In FIG. 9 to FIG. 12, a reference numeral 40 denotes a bobbin constituting an igniter generating a high-voltage, and a reference numeral 41 denotes a guide section formed at the bobbin 40 in one piece. A reference numeral 42 denotes a secondary winding section generating a high-voltage, and a reference numeral 43 denotes a primary winding section of the low-voltage side. A reference numeral 44 denotes a central aperture passing through a central portion of the bobbin 40 in an axial direction of the bobbin 40. A reference numeral 45 denotes a fit recess arranged at an outer periphery of the guide section 41 of the bobbin 40, the fit recess 45 having a ring-shaped inner space allowing insertion of the fit section 2*a* of the lamp plug 2. A reference numeral 50 denotes a high-voltage side terminal arranged in the central aperture 44 of the bobbin 40, and a reference numeral 60 denotes a low-voltage side terminal arranged at the outer periphery of the bobbin 40. A reference numeral 70 denotes a core inserted into the central aperture 44 of the bobbin 40. The bobbin 40, the secondary winding section 42, the primary winding section 43, the high-voltage side terminal 50, the low-voltage side terminal 60 and the core 70 constitute an igniter 71. The guide section 41, the fit recess 45, the high-voltage side terminal 50 and the low-voltage side terminal 60 constitute a lamp holder 72. The igniter 71 and the lamp holder 72 are formed in one piece to constitute an igniter-integrated lamp holder 73. The igniter-integrated lamp holder 73 has the advantage that the discharge lighting device is miniaturized.

In detail, the bobbin 40 equipped with the integrally-formed guide section 41 has a plurality (four in the embodiment 4) of grooves 40*a* to 40*d* which are opened outwardly in a radial direction of the bobbin 40. The secondary winding sections 42 are wound on the respective the grooves 40*a* to 40*d*, and the primary winding sections 43 are wound on the respective outer peripheries of the secondary winding sections 42. The high-voltage side terminal 50 and the core 70 are inserted into the central aperture 44 of the bobbin 40. An output terminal of the high-voltage side of the secondary winding section 42 is connected to the high-voltage side terminal 50. The both terminals are the same potential.

A reference numeral 80 denotes an electronic circuit of the igniter 71, and a reference 81 denotes a harness of the electronic circuit 80. A reference numeral 90 denotes a lower cover accommodating the igniter 71 and electronic parts (not shown) and defined as a component element of the lamp holder 72, and a reference numeral 91 denotes an upper cover. A combination of these parts functions as the lamp holder. A reference numeral 100 denotes an insulating seal member inserted into the outer periphery of the guide section 41 formed integrally at the bobbin 40 and made of silicone rubber, for example. A reference numeral 101 denotes a rim-projection which is projected outwardly from an outer peripheral wall 100*a* of the insulating seal member 100 in a radial direction thereof and which extends over the outer peripheral wall 100*a* in a peripheral direction of thereof. The rim-projection 101 has a triangle-shape in cross section.

Moreover, for convenience of explanation, the insulating seal member removed is shown in the drawings. Actually, as described above, the insulating seal member is assembled with the guide section 41 in a step of assembling the igniter 71.

A method of assembling the insulating seal member 100 will be explained in detail with reference to FIG. 10 hereafter.

First, after the secondary winding section 42 and the primary winding section 43 are wound on the grooves of the bobbin 40, the high-voltage side terminal 50 is inserted fixedly into the central aperture 44 of the bobbin 40. An end of leg of the terminal 50 is then connected to an end of the secondary winding section 42. Here, since the low-voltage side terminal 60 is not mounted on the bobbin 40, an end of thee primary winding section 43 is wound on a pin (not shown) projected from a part of the bobbin 40. Next, the insulating seal member 100 is so moved vertically on the outer periphery of the guide section 41 formed integrally at the bobbin 40 as to be inserted into the outer periphery of the guide section 41. In such a state, the assembly of the bobbin 40 is fully achieved. Moreover, the high-voltage side terminal 50 and the insulating seal member 100 are illustrated in partway for insertion of the parts above in FIG. 10, for a convenience of the explanation.

As described above, with the embodiment 4, since the insulating seal member 100 is assembled at the guide section 41 having no projection therefrom as distinct from the conventional structure, it is possible to facilitate readily work of assembling the insulating seal member 100.

With the embodiment 4, as in the cases of the embodiment 1 to the embodiment 3, it is possible to resist affixing the insulating seal member 100 to the inner peripheral wall 2*d* of the fit section 2*a* of the lamp plug 2 and to reduce substantially friction between them. Even when the rim-projection 101 of the outer peripheral wall 100*a* of the insulating seal member 100 is affixed to the inner peripheral wall 2*d* of the fit section 2*a* of the lamp plug 2, the adhesive force is very weak. When the lamp plug 2 is removed from the lamp holder, it is possible to prevent the insulating seal member 100 from being removed from the lamp holder together with the lamp plug 2. The construction is effective to improve insulation performance of the insulating seal member 100. Therefore, it is possible to hold the insulating seal member 100 on the bobbin 40 with stability without loss of the insulation performance.

With the embodiment 4, the rib-shaped rim-projection 101 is arranged at the outer peripheral wall 100*a* of the insulating seal member 100. The invention is not limited to such a construction and is not restricted to the shape, the number, or the direction of the rim-projection 101.

With the embodiment 4, the rim-projection 101 has a triangle-shape in cross section. The rim-projection 101 may have any shape such as half-round shape or trapezoidal shape in cross section, the shape allowing reduction of the contact area between the rim-projection 101 and the inner peripheral wall 2*d* of the fit section 2*a* of the lamp plug 2. It is possible to obtain a similar effect to the peripheral case even when the projection is formed in an axial direction of the lamp plug 2 instead of the peripheral direction.

Alternative Example 1 of Embodiment 4

Figure 13:
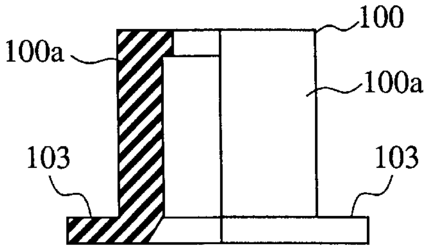
FIG. 13 is a diagrammatic front view, partially cross-sectioned, of alternative example 1 of the insulating seal member in the lamp holder as embodiment 4 shown in FIG. 9, FIG. 10 and FIG. 12.

FIG. 13 is a diagrammatic front view, partially cross-sectioned, of alternative example 1 of the insulating seal member in the lamp holder as embodiment 4 shown in FIG. 9, FIG. 10 and FIG. 12.

With the alternative example 1, a brim-shaped edge-projection 103 is formed at the outer peripheral wall 100*a* of the insulating seal member 100 instead of the rim-projection 101 in the embodiment 4. The brim-shaped edge-projection 103 projects outwardly from one end of the wall 100*a* in a radial direction of the wall 100*a* and extends over the wall 100*a* in a peripheral direction of the wall 100*a*. The wall 100*a* of the insulating seal member 100 is separated from the inner peripheral wall 2*d* of the fit section 2*a* of the lamp plug 2.

As described above, with the alternative example 1, the inner peripheral wall 2*d* of the fit section 2*a* of the lamp plug 2 does not make into contact with the outer peripheral wall 100*a* of the insulating seal member 100. The front end of the fit section 2*a* of the lamp plug 2 also makes into contact with only the brim-shaped edge-projection 103 arranged at the insulating seal member 100. In this way, the inner peripheral wall 2*d* of the fit section 2*a* of the lamp plug 2 is not entirely affixed to the outer peripheral wall 100*a* of the insulating seal member 100. When the lamp plug 2 is therefore removed from the lamp holder to replace the discharge lamp 1 by new one, the insulating seal member 100 does not separate from the lamp holder 3 with the insulating seal member 100 being affixed to the lamp plug 2. Since the inner peripheral wall 2*d* does not make into contact with the outer peripheral wall 100*a*, it is possible to reduce the risk of the member 100 being rolled up and torn previously even when a high-flexible, easy-to-tear material such as silicone rubber is used as the member 100. It is possible to keep the insulating functions with stability even when the replacement of the lamp is repeated.

Alternative Example 2 of Embodiment 4

Figure 14:
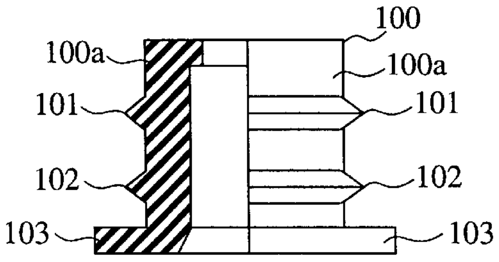
FIG. 14 is a diagrammatic front view, partially cross-sectioned, of alternative example 2 of the insulating seal member in the lamp holder as embodiment 4 shown in FIG. 9, FIG. 10 and FIG. 12.

FIG. 14 is a diagrammatic front view, partially cross-sectioned, of alternative example 2 of the insulating seal member in the lamp holder as embodiment 4 shown in FIG. 9, FIG. 10 and FIG. 12. As shown in FIG. 14, the rim-projection 102 and the brim-shaped edge-projection 103 are formed at the outer peripheral wall 100*a* of the insulating seal member 100. The rim-projection 102 has the same shape in cross section as the rim-projection 101 and extends in the peripheral direction parallel to the rim-projection 101. The brim-shaped edge-projection 103 projects outwardly from one end of the outer peripheral wall 100*a* in a radial direction of the wall 100*a* and extends over the outer peripheral wall 100*a* in a peripheral direction of the wall 100*a*.

With the alternative example 2 of the embodiment 4, it is possible to facilitate assembling the insulating seal member 100 into the lamp holder 3. The outer peripheral wall 100*a* makes into contact with the inner peripheral wall 2*d* via only the rim-projections 101 and 102. Therefore, if the rim-projections 101 and 102 of the outer peripheral wall 100*a* of the insulating seal member 100 is affixed to the inner peripheral wall 2*d*, the adhesive force is very weak. Furthermore, the rim-projections 101 and 102 are effective to improve insulation performance of the insulating seal member 100. When the lamp plug 2 is removed from the lamp holder, it is possible to prevent the insulating seal member 100 from being removed from the lamp holder together with the lamp plug 2. Therefore, it is possible to hold the insulating seal member 100 on the lamp holder 3 with stability without loss of the insulation performance.

Moreover, in any of the embodiment 1 to the embodiment 4, the high-voltage side terminal is arranged at the central section of the lamp holder and the low-voltage side terminal is arranged at the outer periphery of the central section of the lamp holder. Alternatively, such a reversed construction may be adopted.

INDUSTRIAL APPLICABILITY

As described above, the lamp holder according to the invention has a simple structure with improved workability without increasing a parts count. The lamp holder allows reduction of the cost of manufacture, and prevents the insulating seal member adhered to the lamp plug from being broken away from the lamp plug on removing the discharge lamp to replace it by new one. The lamp holder allows to preclude defective insulation caused by dropouts, displacements, entanglement or cracking of the insulating seal member on assembling new parts into the lamp holder, and prevent malfunctions such as damage of the lamp or no-lighting and so on. The lamp holder is adequate to hold the HID lamp, for example, which is used as automotive headlights.

What is claimed is:

1. A lamp holder, comprising: a fitting recess for receiving a lamp plug; a high-voltage side terminal arranged at any one of a central section of the fitting recess and a peripheral section surrounding the central section of the fitting recess; a low-voltage side terminal arranged at the other; and an insulation seal member disposed in said fitting recess and insulating between the low-voltage side terminal and the high-voltage side terminal, wherein said insulation seal member comprises at least one projection which is so projected outwardly from an outer peripheral wall of the insulation seal member as to make contact with an inner peripheral wall of a cylindrical fitting section of the lamp plug.

2. A lamp holder according to claim 1, wherein the projection of the insulation seal member is a rib-shaped rim-projection projected outwardly from the outer peripheral wall of the insulation seal member in a radial direction of the insulation seal member and extending in a peripheral direction.

3. A lamp holder according to claim 1, wherein the projection of the insulation seal member is a brim-shaped edge-projection projected outwardly from an edge of the insulation seal member in a radial direction of the insulation seal member, wherein the cylindrical fitting section of the lamp plug presses the brim-shaped edge-projection against the fitting recess and wherein the outer peripheral wall of the insulation seal member keeps a distance from the inner peripheral wall of the fitting section of the lamp plug.

4. A lamp holder according to claim 1, wherein the projection of the insulation seal member includes a rim-projection projected outwardly from the outer peripheral wall of the insulation seal member in a radial direction of the insulation seal member and a brim-shaped edge-projection projected outwardly from an edge of the insulation seal member in a radial direction of the insulation seal member, and wherein the cylindrical fitting section of the lamp plug presses the brim-shaped edge-projection against the fitting recess.

5. A lamp holder according to claim 4, wherein the rim-projection is at least one rib extending in a peripheral direction of the insulation seal member.

6. A lamp holder, comprising: a high-voltage side terminal formed at an igniter generating a high voltage in one piece and installed in a socket for allowing insertion of a lamp plug, wherein a secondary side coil of the igniter is connected with a central section of the socket; a low-voltage side terminal connected with a driving circuit in a periphery of the socket; and an insulation seal member disposed in said socket and insulating between the low-voltage side terminal and the high-voltage side terminal, wherein a guide section allowing insertion of the insulation seal member is formed integrally at a bobbin constituting a primary and secondary winding of the igniter, and wherein said insulation seal member comprises at least one projection which is so projected outwardly from an outer peripheral wall of the insulation seal member as to make contact with an inner peripheral wall of a cylindrical fitting section of the lamp plug.

7. A lamp holder according to claim 6, wherein the projection of the insulation seal member is a rib-shaped rim-projection projected outwardly from the outer peripheral wall of the insulation seal member in a radial direction of the insulation seal member and extending in a peripheral direction.

8. A lamp holder according to claim 6, wherein the projection of the insulation seal member is a brim-shaped edge-projection projected outwardly from an edge of the insulation seal member in a radial direction of the insulation seal member, wherein the cylindrical fitting section of the lamp plug presses the brim-shaped edge-projection against the socket and wherein the outer peripheral wall of the insulation seal member keeps a distance from the inner peripheral wall of the cylindrical fitting section of the lamp plug.

9. A lamp holder according to claim 6, wherein the projection of the insulation seal member includes a rim-projection projected outwardly from the outer peripheral wall of the insulation seal member in a radial direction of the insulation seal member and a brim-shaped edge-projection projected outwardly from an edge of the insulation seal member in a radial direction of the insulation seal member, and wherein the cylindrical fitting section of the lamp plug presses the brim-shaped edge-projection against the socket.

10. A lamp holder according to claim 9, wherein the rim-projection is at least one rib extending in a peripheral direction of the insulation seal member.

* * * * *